(12) United States Patent
Ibe et al.

(10) Patent No.: US 7,510,600 B2
(45) Date of Patent: Mar. 31, 2009

(54) GAS PURIFYING APPARATUS

(75) Inventors: Masaya Ibe, Susono (JP); Hirohito Hirata, Suntou-gun (JP); Masaru Kakinohana, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 296 days.

(21) Appl. No.: 11/355,973

(22) Filed: Feb. 17, 2006

(65) Prior Publication Data

US 2006/0207428 A1 Sep. 21, 2006

(30) Foreign Application Priority Data

Mar. 16, 2005 (JP) ............... 2005-075951

(51) Int. Cl.
*B03C 3/013* (2006.01)

(52) U.S. Cl. ............ 96/52; 60/275; 95/58; 95/62; 96/66; 96/68

(58) Field of Classification Search ........... 96/52, 96/66, 68, 69; 95/58, 62; 60/275; 55/385.3, 55/DIG. 30
See application file for complete search history.

(56) References Cited

U.S. PATENT DOCUMENTS

| | | | | |
|---|---|---|---|---|
| 2,841,242 A | * | 7/1958 | Hall | 95/58 |
| 2,973,054 A | * | 2/1961 | Kurtz | 96/66 |
| 3,503,704 A | * | 3/1970 | Marks | 423/212 |
| 4,205,969 A | * | 6/1980 | Matsumoto | 96/66 |
| 5,044,157 A | | 9/1991 | Henkel | |
| 5,055,115 A | * | 10/1991 | Yikai et al. | 96/59 |
| 5,402,639 A | | 4/1995 | Fleck | |
| 5,484,472 A | * | 1/1996 | Weinberg | 96/26 |
| 5,656,063 A | * | 8/1997 | Hsu | 95/58 |
| 5,667,563 A | * | 9/1997 | Silva, Jr. | 96/50 |
| 5,702,507 A | * | 12/1997 | Wang | 96/55 |
| 5,935,538 A | * | 8/1999 | Tabatabaie-Raissi et al. | 423/215.5 |
| 6,042,637 A | * | 3/2000 | Weinberg | 96/58 |
| 6,176,977 B1 | * | 1/2001 | Taylor et al. | 204/176 |
| 6,544,485 B1 | * | 4/2003 | Taylor | 422/186.04 |
| 6,797,035 B2 | * | 9/2004 | Baldrey et al. | 95/58 |
| 2003/0233824 A1 | | 12/2003 | Chun et al. | |
| 2004/0089156 A1 | * | 5/2004 | Gartstein et al. | 96/53 |
| 2004/0188238 A1 | | 9/2004 | Hemingway et al. | |

FOREIGN PATENT DOCUMENTS

| | | |
|---|---|---|
| EP | 1 020 620 A1 | 7/2000 |
| EP | 1 441 112 A1 | 7/2004 |
| JP | B2 6-29545 | 5/1989 |
| JP | B2 2698804 | 4/1997 |
| JP | A 2003-286819 | 10/2003 |
| JP | A 2004-19534 | 1/2004 |
| JP | A 2004-176679 | 6/2004 |
| JP | A 2005-036667 | 2/2005 |
| WO | WO 2004/015252 A1 | 2/2004 |

\* cited by examiner

*Primary Examiner*—Richard L Chiesa
(74) *Attorney, Agent, or Firm*—Oliff & Berridge, PLC (57) ABSTRACT

A gas purifying apparatus includes an adsorption member (e.g., a honeycomb structural body) that adsorbs particulate matter contained in the gas by the action of an electric field. The apparatus also includes a supply device (e.g., an ozone generator including a discharger, a pulsed power supply, a pump, and a discharge port) that supplies a pro-oxidant to the adsorption member.

21 Claims, 7 Drawing Sheets

GAS PURIFYING APPARATUS

The disclosure of Japanese Patent Application No. 2005-075951 filed on Mar. 16, 2005 including the specification, drawings and abstract is incorporated herein by reference in its entirety.

BACKGROUND OF THE INVENTION

1. Field of the Invention

The invention relates generally to a gas purifying apparatus, and, more specifically, to gas purifying apparatus that trap particulate matter contained in gas.

2. Description of Related Art

Diesel particulate filters (DPF) with porous honeycomb structural bodies, that remove particulate matter (PM) contained in exhaust gas emitted from a diesel engine, a lean-burn engine, or the like have been described, for example, in Japanese Patent Application Publication No. JP-A-06-29545. In such described DPFs, a plurality of opening portions passes through the honeycomb structural body from the upstream end face to the downstream end face. Some opening portions are closed at the respective upstream ends and open at the respective downstream ends. Other opening portions are closed at the respective downstream ends and open at the respective upstream ends. Thus, exhaust gas flowing into the opening portions open at the upstream ends is filtered when passing through the porous partition walls. The exhaust gas that passes through the partition walls flows into and is then discharged from the adjacent opening portions that are open at the downstream ends. While the exhaust gas is passing through the partition walls, the PM contained in the exhaust gas is trapped in the partition walls.

An apparatus that includes a cylindrical peripheral electrode that is open at both the upstream end and the downstream end has been described. Specifically, Japanese Patent Application Publication No. JP-A-2004-19534 describes an apparatus having a single rod-shaped center electrode that extends from a position near the upstream end of the peripheral electrode and that passes through the axis of the peripheral electrode. In this apparatus, the PM contained in the exhaust gas, which is electrically-charged by the center electrode, is adsorbed to the peripheral electrode by the interaction between the electric potential and the electric field produced between the two electrodes. A part of the PM adsorbed to the peripheral electrode is burned, and a plasma state is generated due to a high voltage applied between the two electrodes. Then, the oxidation of PM is promoted.

SUMMARY

It is an object of the invention to suppress accumulation of PM in a gas purifying apparatus that purifies exhaust gas by the action of a high voltage.

An aspect of the invention relates to a gas purifying apparatus in which the particulate matter contained in the gas supplied to the gas purifying apparatus is adsorbed to an adsorption member by the action of an electric field. The gas purifying apparatus includes a supply device that supplies a pro-oxidant to the adsorption member.

Because the above-mentioned gas purifying apparatus includes the supply device that supplies the pro-oxidant to the adsorption member, removal of the PM adsorbed to the adsorption member by oxidizing and/or burning the PM is promoted. Accordingly, accumulation of the PM in the adsorption member is suppressed.

BRIEF DESCRIPTION OF THE DRAWINGS

The foregoing and further objects, features and advantages of the invention will become apparent from the following description of preferred embodiments with reference to the accompanying drawings, in which the same or corresponding portions are denoted by the same reference numerals, and wherein.

DETAILED DESCRIPTION OF EXEMPLARY EMBODIMENTS

Hereafter, a gas purifying apparatus according to exemplary embodiments of the invention will be described in detail with reference to the accompanying drawings.

Figure 1:
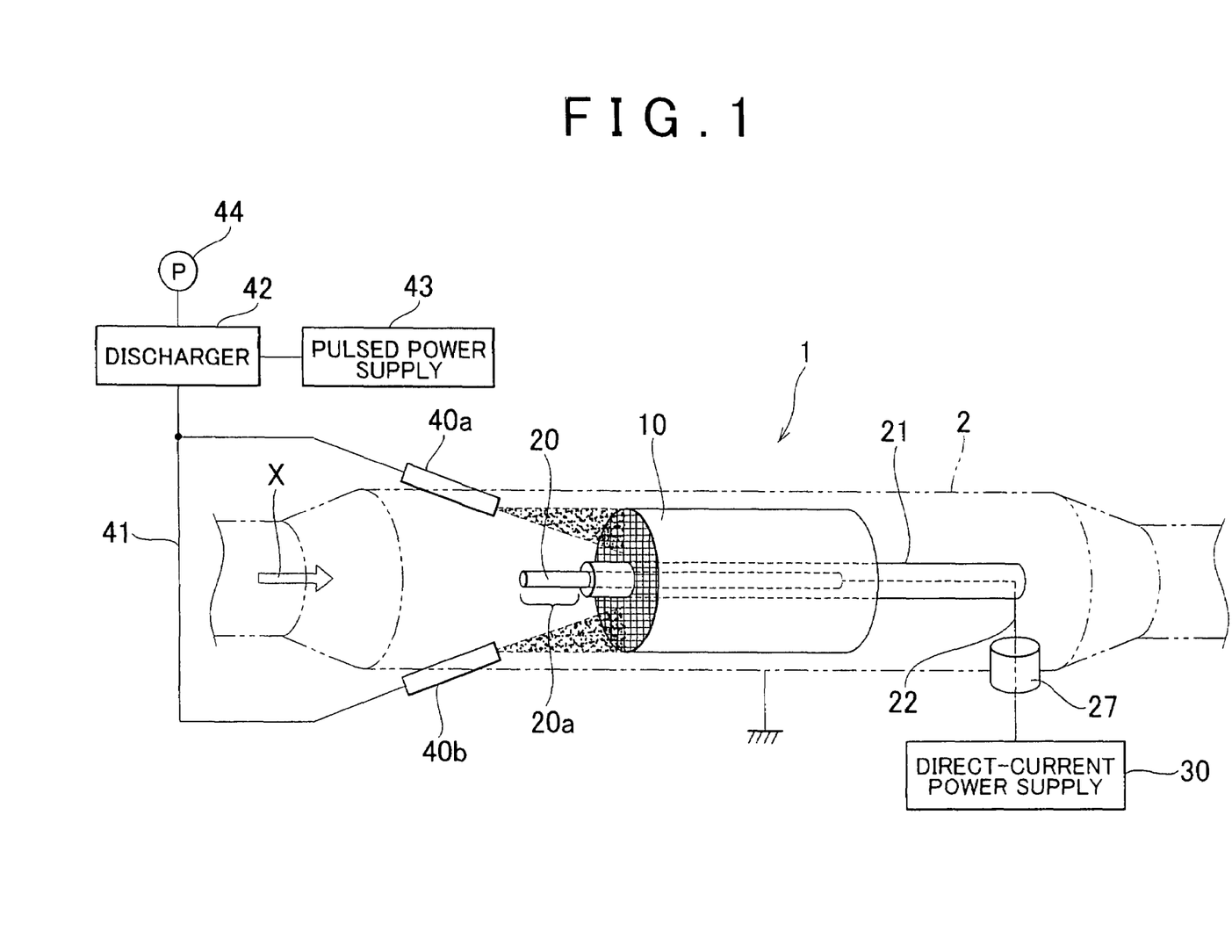
FIG. 1 is a schematic view of a gas purifying apparatus according to a first embodiment of the invention.
Figure 2:
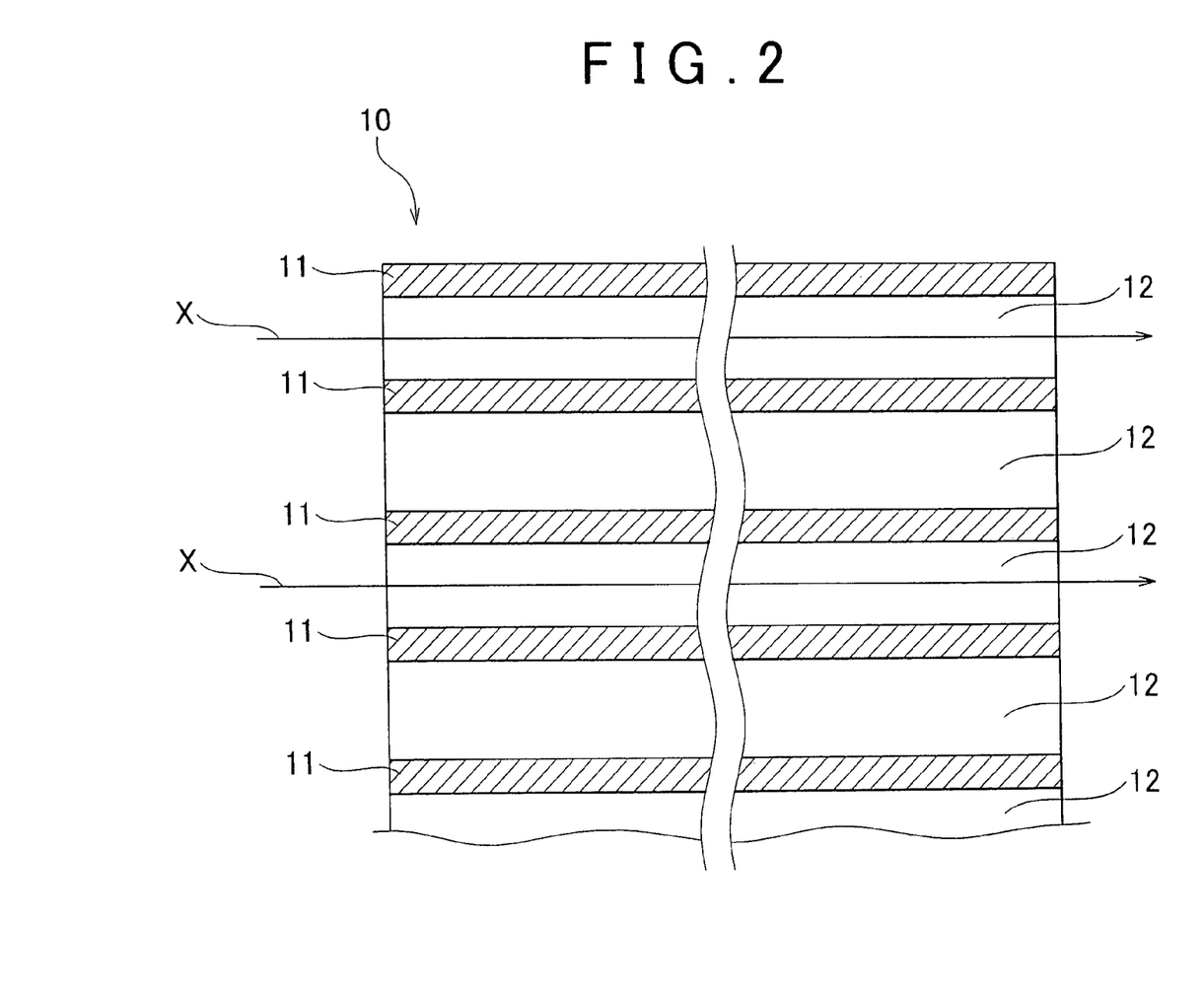
FIG. 2 is a cross sectional view of a honeycomb structural body.

FIG. 1 is a schematic view of a gas purifying apparatus 1 according to a first embodiment of the invention. FIG. 2 is a cross sectional view of a honeycomb structural body 10 that is a main portion of the gas purifying apparatus 1. The gas purifying apparatus 1 is provided downstream of the exhaust system of an engine (a diesel engine, a lean-burn engine, or the like) (not shown) mounted in a vehicle, that is, downstream of the exhaust port of the engine.

The gas purifying apparatus 1 includes a metal case 2, and the honeycomb structural body 10 supported inside the case 2. The case 2 and the honeycomb structural body 10 may be in close contact with each other. Sealing may be provided between the case 2 and the honeycomb structural body 10 by an alumina mat (not shown), or the like. The case 2 serves as the exterior shell of the gas purifying apparatus 1, and also serves as the receiving electrode when electrically grounded. Instead of employing the structure where the case 2 also serves as the receiving electrode, a cylindrical receiving electrode that differs from the case 2 may be provided on the outer surface of the honeycomb structural body 10.

As shown in FIG. 2, the honeycomb structural body 10 includes a plurality of cells, namely, a plurality of exhaust gas passages 12 that are divided by porous partition walls 11. Each exhaust gas passage 12 is parallel to the direction in which the exhaust gas flows in the gas purifying apparatus 1 (the direction indicated by the arrow X in the figures).

The honeycomb structural body 10 may be made of a porous ceramic material. More specifically, the honeycomb structural body 10 may be made of cordierite, SiC (silicon carbide), or the like.

The partition walls 11 of the honeycomb structural body 10 are coated with a catalytic substance, for example, a NOx storage reduction catalyst (NSR), which contains 3 moles of lithium per liter (Li=3 mol/L) and 5 grams of platinum per liter (Pt=5 g/L) and in which $Al_2O_3$ is used as a coating material. The amount of NOx storage reduction catalyst applied onto the partition walls 11 is, for example, 300 grams per liter (300 g/L).

The porosity of the partition wall in the commonly used honeycomb structural body is usually 55% to 60%, and the average diameter of the pores formed in the partition walls is 9 µm to 30 µm. In contrast, in the first embodiment, the porosity is 60% to 80%, and the average diameter of the pores formed in the partition walls 11 is 20 µm to 60 µm. Accordingly, the resistance to the flow of the exhaust gas can be relatively low. Usually, the amount of supported catalytic substance is approximately 150 grams per liter (150 g/L). In contrast, in the first embodiment, a relatively large amount, for example, 100 grams to 400 grams of catalytic substance per liter can be supported. Also, the resistance to the flow of the exhaust gas can be suppressed even when the catalytic substance is supported.

Referring again to FIG. 1, a center electrode 20 passes through the honeycomb structural body 10. The center electrode 20 extends coaxially with the honeycomb structural body 10 and in parallel to the direction in which the exhaust gas flows through the gas purifying apparatus 1 (the direction indicated by the arrow X in the figures). The outer surface of the center electrode 20 excluding an exposed portion 20a is coated with an insulating layer 21. The exposed portion 20a is the upstream end portion of the center electrode 20. The insulating layer 21 is supported by the communication hole formed along the axis of the honeycomb structural body 10. Asperities (surface elevations) for promoting discharge, for example, threads may be formed on the exposed portion of the outer surface of the center electrode 20.

A metal wire 22 is connected to the downstream end portion of the center electrode 20. An insulating plug 27 made, for example, of ceramics is fixed to the case 2. The metal wire 22 extends out of the case 2 through the insulating plug 27, and is connected to a direct-current power supply 30.

The center electrode 20 may be made of chrome steel having excellent corrosion resistance (for example, 10Cr5A1). However, the material of the center electrode 20 is not limited to chrome steel. The center electrode 20 may be made of another corrosion-resistant conductive material. The insulating layer 21 may be made of a highly heat-resistant material such as ceramics. However, in engines where the temperature of the exhaust system is low, for example, diesel engines, the insulating layer 21 may be made of a relatively low heat-resistant material such as acrylic resin.

In the first embodiment, an pro-oxidant (ex. ozone) generator including a discharger 42 and a pulsed power supply 43 is used. Discharge ports 40a and 40b through which the pro-oxidant is supplied into the case 2 are fixed to the case 2. The discharge ports 40a and 40b are connected to the discharger 42 by a supply pipe 41 through which the pro-oxidant is supplied, and the discharger 42 is connected to the pulsed power supply 43 for driving the discharger 42. Corona discharge is generated between paired electrodes (not shown) in the discharger 42, using the electric power supplied from the pulsed power supply 43. A pump 44 that introduces outside air to the discharger 42 is connected to the discharger 42.

The PM accumulates at the upstream end face of the honeycomb structural body in a composite apparatus in which a honeycomb structural body including a plurality of cells is provided in the peripheral electrode of the apparatus described in Japanese Patent Application Publication No. JP-A-2004-19534. The accumulated PM causes a short circuit and an electric leak between the center electrode and the peripheral electrode. As a result, the efficiency in purifying gas may be reduced.

In the first embodiment, the discharge ports 40a and 40b are provided such that the pro-oxidant discharged from the discharge ports 40a and 40b flows with the exhaust gas to the case 2 which serves as the receiving electrode and the upstream end portion of the honeycomb structural body 10.

Each of the direct-current power supply 30 and the pulsed power supply 43 includes an inverter circuit, a transformer, a diode for rectification, a smoothing circuit, and the like. The voltage of the direct-currents supplied from batteries (not shown) is increased, and then electric power is supplied to the center electrode 20 and the discharger 42. The electric current supplied from each of the direct-current power supply 30 and the pulsed power supply 43 is not limited to a direct-current. The electric current supplied from each of the direct-current power supply 30 and the pulsed power supply 43 may have a waveform selected, for example, from a direct-current wave pulse, an alternating current, an alternating current wave pulse, and a combination of a direct-current and a direct-current wave pulse. The electric power supplied from the direct-current power supply 30 and the pulsed power supply 43 may have any level of voltage. The direct-current power supply 30 and the pulsed power supply 43 are controlled by an electronic control unit (ECU) (not shown). The ECU is configured to stop the operation of the direct-current power supply 30 if an overcurrent flows to the direct-current power supply 30 due, for example, to a short-circuit that has occurred between the electrodes.

In the gas purifying apparatus 1 configured according to the first embodiment, if exhaust gas containing the PM is discharged from the engine and introduced into the case 2 through the exhaust pipe, the exhaust gas flows in the honeycomb structural body 10 through the exhaust gas passages 12 which are open at the upstream ends, and then discharged downstream out of the honeycomb structural body 10 through the exhaust gas passages 12 which are open at the downstream ends.

Meanwhile, if the direct-current power supply 30 is turned ON when the engine is started and a high voltage is applied between the center electrode 20 and the case 2, any PM contained in the exhaust gas becomes negatively charged due to the electric power discharged from the center electrode 20, and the electric field is produced between the center electrode 20 and the case 2. Therefore, the PM is drawn toward the honeycomb structural body 10 due to electric attraction. Oxidization and/or burning of the PM adsorbed to the honeycomb structural body 10 are/is promoted by the heat supplied from the exhaust gas and the activated gas generated by the application of a high voltage.

Meanwhile, corona discharge is generated between the electrodes (not shown) in the discharger 42, using the electric power supplied from the pulsed power supply 43, and acts on the air supplied due to the operation of the pump 44. Thus, ozone that serves as the activated species or the pro-oxidant is formed. More specifically, an electron contacts an oxygen molecule $O_2$ present in the air to generate oxygen atoms ($O_2 \Rightarrow O+O$), and an oxygen atom bonds with oxygen molecules to generate ozone $O_3$ ($O+O_2+O_2 \Rightarrow O_3+O_2$). The thus generated ozone is discharged from the discharge ports 40a and 40b into the case 2, and supplied toward the case 2 serving as the receiving electrode and the upstream end portion, including the periphery, of the honeycomb structural body 10. The ozone promotes oxidation and/or burning of the PM contained in the exhaust gas and the PM (consisting mainly of carbon C) adhering to the honeycomb structural body 10. As a result, according to the first embodiment, the PM can be burned and/or oxidized at a lower temperature (for example, a temperature equal to or lower than 300° C.), than when a pro-oxidant is not used (approximately 650° C. to 700° C.).

As described so far, according to the first embodiment, because the honeycomb structural body 10 serving as the adsorption portion is provided with the pro-oxidant supply source that supplies the ozone serving as a pro-oxidant, removal of the PM adhering to the honeycomb structural body 10 by oxidizing and/or burning the PM is promoted. Accordingly, accumulation of the PM in the honeycomb structural body 10 is suppressed. Also, it is possible to suppress an increase in the electric power consumption caused by a short-circuit between the electrodes with the end face of the base material interposed therebetween.

Also, in the apparatus where the honeycomb structural body is provided between the center electrode and the case that serve as the first electrode and the second electrode, respectively, and that are opposite in polarity, the PM accumulates on the upstream end face of the honeycomb structural body, and a short circuit and an electric leak are likely to occur between the electrodes. However, according to the first embodiment, because the ozone serving as the pro-oxidant is supplied onto the upstream end face of the honeycomb structural body 10, it is possible to effectively suppress a short-circuit and an electric leak caused by the PM accumulated on the upstream end face of the honeycomb structural body.

Next, a second embodiment of the invention will be described. In the first embodiment, the discharge ports 40*a* and 40*b* are fixed to the case 2, and the ozone discharged from the discharge ports 40*a* and 40*b* are supplied onto the upstream end face of the honeycomb structural body 10. However, arrangement of the supply route through which the pro-oxidant is supplied is not particularly limited in the invention. The second embodiment described below is a modified example concerning the supply route through which the pro-oxidant is supplied.

Figure 3:
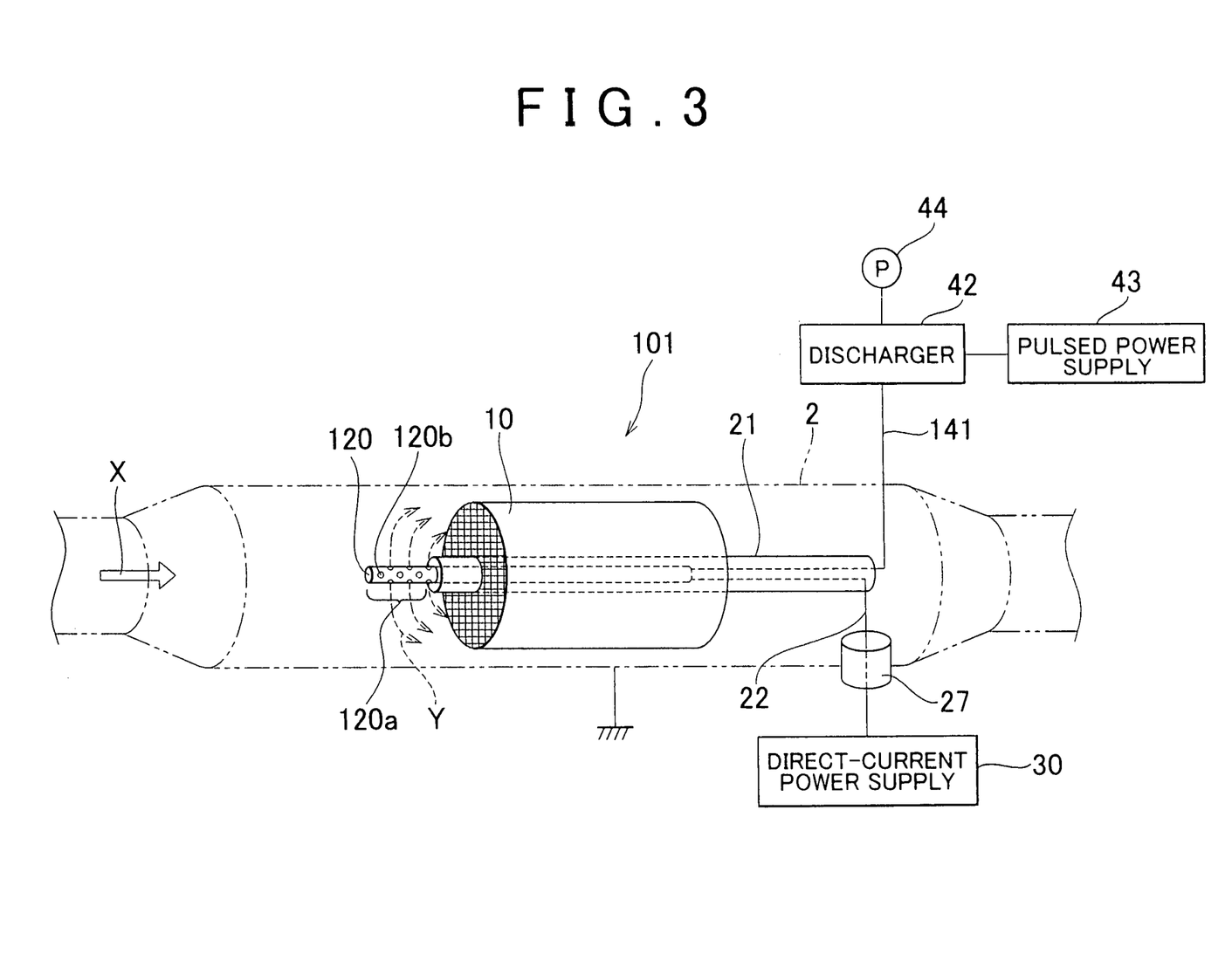
FIG. 3 is a schematic view of a gas purifying apparatus according to a second embodiment of the invention.

As shown in FIG. 3, a gas purifying apparatus 101 according to the second embodiment of the invention includes a center electrode 120. An inner hole (or passage) (not shown) that is the hollow portion of the center electrode 120 passes through the substantially rod-shaped center electrode 120 in the longitudinal direction. The inner hole is closed at the upstream end face of the center electrode 120, and open at the downstream end face of the center electrode 120. A plurality of communication holes 120*b*, which provide communication between the inner hole of the center electrode 120 and the outside of the center electrode 120, are formed in an exposed portion 120*a* of the center electrode 120. The exposed portion is a portion of the center electrode 120 near the upstream end portion, and is not covered with the insulating layer 21.

A supply pipe 141 through which the pro-oxidant is supplied is connected to the downstream end portion of the center electrode 120, and the supply pipe 141 communicates with the inner hole of the center electrode 120. The supply pipe 141 is connected to the same discharger 42 as in the first embodiment. Because the remaining configuration of the second embodiment is the same as the first embodiment, the same or corresponding portions are denoted by the same reference numerals, and the detailed description thereof is not repeated here.

In the thus configured gas purifying apparatus 101 according to the second embodiment, corona discharge is generated between the electrodes (not shown) in the discharger 42, using the electric power supplied from the pulsed power supply 43, and acts on the air supplied due to the operation of the pump 44. Thus, the ozone serving as the activated species or the pro-oxidant is generated. The thus generated ozone is radially discharged from the communication holes 120*b* serving as the discharge ports in the direction indicated by the arrows Y in FIG. 3, and supplied toward the upstream end face of the honeycomb structural body 10. The ozone promotes oxidation and/or burning of the PM contained in the exhaust gas and the PM (consisting mainly of carbon C) adhering the honeycomb structural body 10.

As described so far, in the second embodiment, the center electrode 120 passes through the honeycomb structural body 10 serving as the adsorption portion. Also, the inner hole formed in the center electrode 120 is used as at least a part of the supply route through which the pro-oxidant is supplied from the pro-oxidant supply source to the communication holes 120*b* (discharge ports). In addition, the communication holes 120*b*, which are formed near the upstream end portion of the center electrode 120 and which communicate with the inner hole, are used as the discharge ports. Accordingly, the ozone serving as the pro-oxidant can be efficiently supplied onto the portion near the center of the upstream end face of the honeycomb structural body 10, where a particularly large amount of PM tends to adhere for a hydrodynamic reason.

Next, a third embodiment of the invention will be described. The third embodiment is another modified example concerning the supply route through which the pro-oxidant is supplied in the invention.

Figure 4:
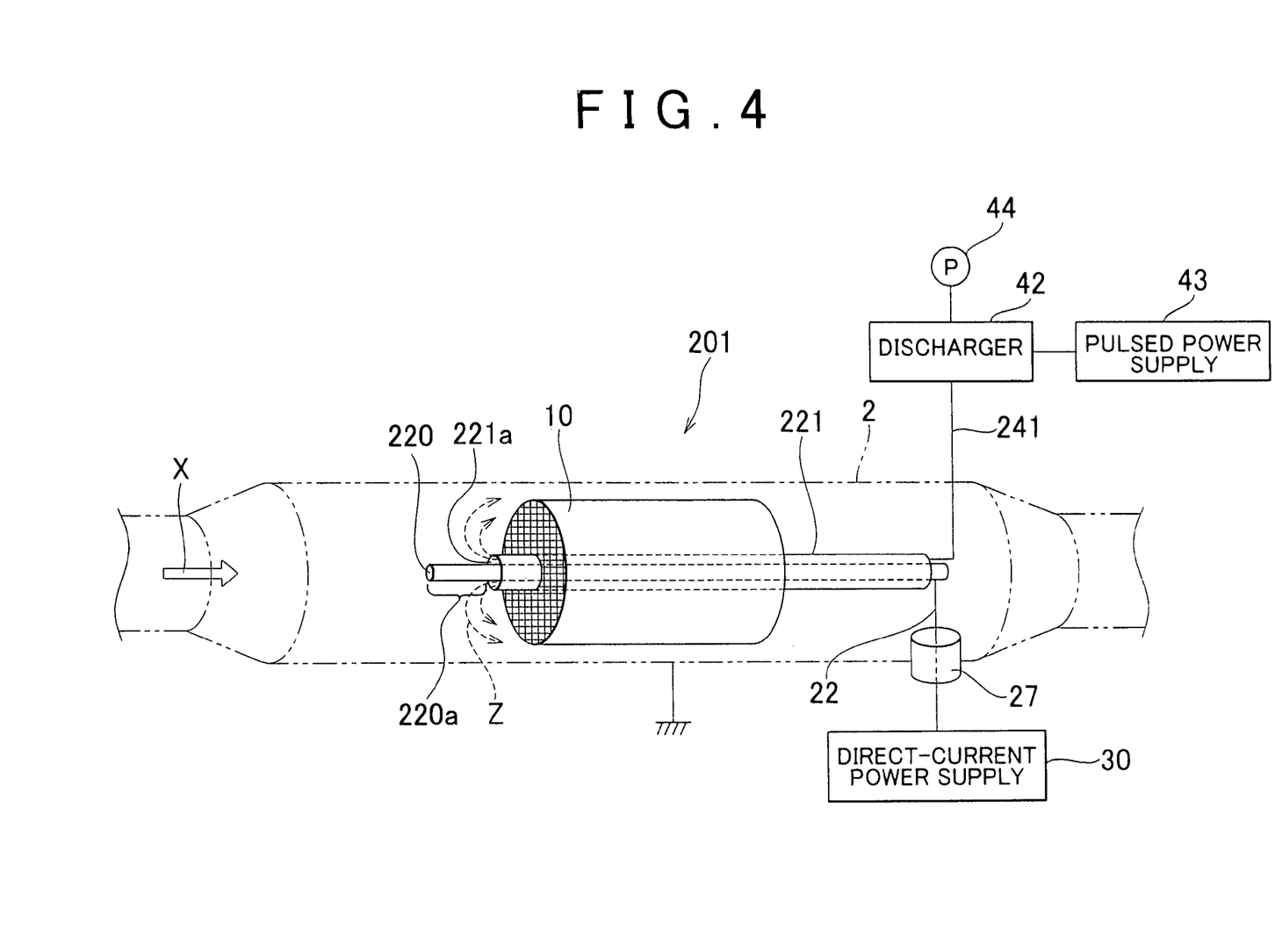
FIG. 4 is a schematic view of a gas purifying apparatus according to a third embodiment of the invention.

As shown in FIG. 4, in a gas purifying apparatus 201 according to the third embodiment of the invention, a rod-shaped solid center electrode 220 passes through the honeycomb structural body 10, and a cylindrical supply pipe 221 surrounds the center electrode 220.

An opening portion 221*a* that is the upstream end portion of the supply pipe 221 is used as the discharge port through which the pro-oxidant is discharged. The upstream end portion of the center electrode 220 is an exposed portion 220*a* that protrudes from the opening portion 221*a*.

A supply pipe 241 is connected to the downstream end portion of the supply pipe 221. The pro-oxidant (ex. ozone) from the discharger 42 is supplied through the supply pipe 241 and the supply pipe 221 by the pressure generated by the pump 44, and discharged from the opening portion 221*a*. Because the remaining configuration of the third embodiment is the same as the first and the second embodiments, the same or corresponding portions are denoted by the same reference numerals, and the detailed description thereof is not repeated here.

In the thus configured gas purifying apparatus 201 according to the third embodiment, corona discharge is generated between the electrodes (not shown) in the discharger 42, using the electric power supplied from the pulsed power supply 43, and acts on the air supplied due to the operation of the pump 44. Thus, the ozone serving as the activated species or the pro-oxidant is generated. The thus generated ozone is radially discharged in the direction indicated by the arrows Z from the opening portion 221*a* serving as the discharge port, and supplied toward the upstream end face of the honeycomb structural body 10. The ozone promotes oxidization and/or burning of the PM (consisting mainly of carbon C) adhering to the honeycomb structural body 10.

As described so far, in the third embodiment, the center electrode 220 passes through the honeycomb structural body 10. Also, the cylindrical supply pipe 221 surrounding the center electrode 220 is used as at least a part of the supply route through which the pro-oxidant is supplied. In addition, the pro-oxidant, namely, the ozone is supplied from the discharge port 221*a*, which surrounds the center electrode 220 and which is the upstream end portion of the supply pipe 221, toward the upstream end face of the honeycomb structural body 10. Therefore, as in the second embodiment, the ozone serving as the pro-oxidant can be efficiently supplied to the portion near the center of the upstream end face of the honeycomb structural body 10, where a particularly large amount of PM tends to adhere for a hydrodynamic reason. In addition, because a solid electrode can be used as the center electrode 220 and the inner hole need not be formed in it, production cost can be suppressed.

Next, a fourth embodiment according to the invention will be described. In each of the first to third embodiments, the honeycomb structural body 10 has a substantially cylindrical shape, and the center electrode 20, 120 or 220 passes through the honeycomb structural body 10. However, the shape of the adsorption portion or the honeycomb structural body in the invention is not particularly limited, and the center electrode need not pass through the honeycomb structural body. The fourth embodiment is a modified example concerning the electrode and the adsorption portion in the first to third embodiments.

Figure 5:
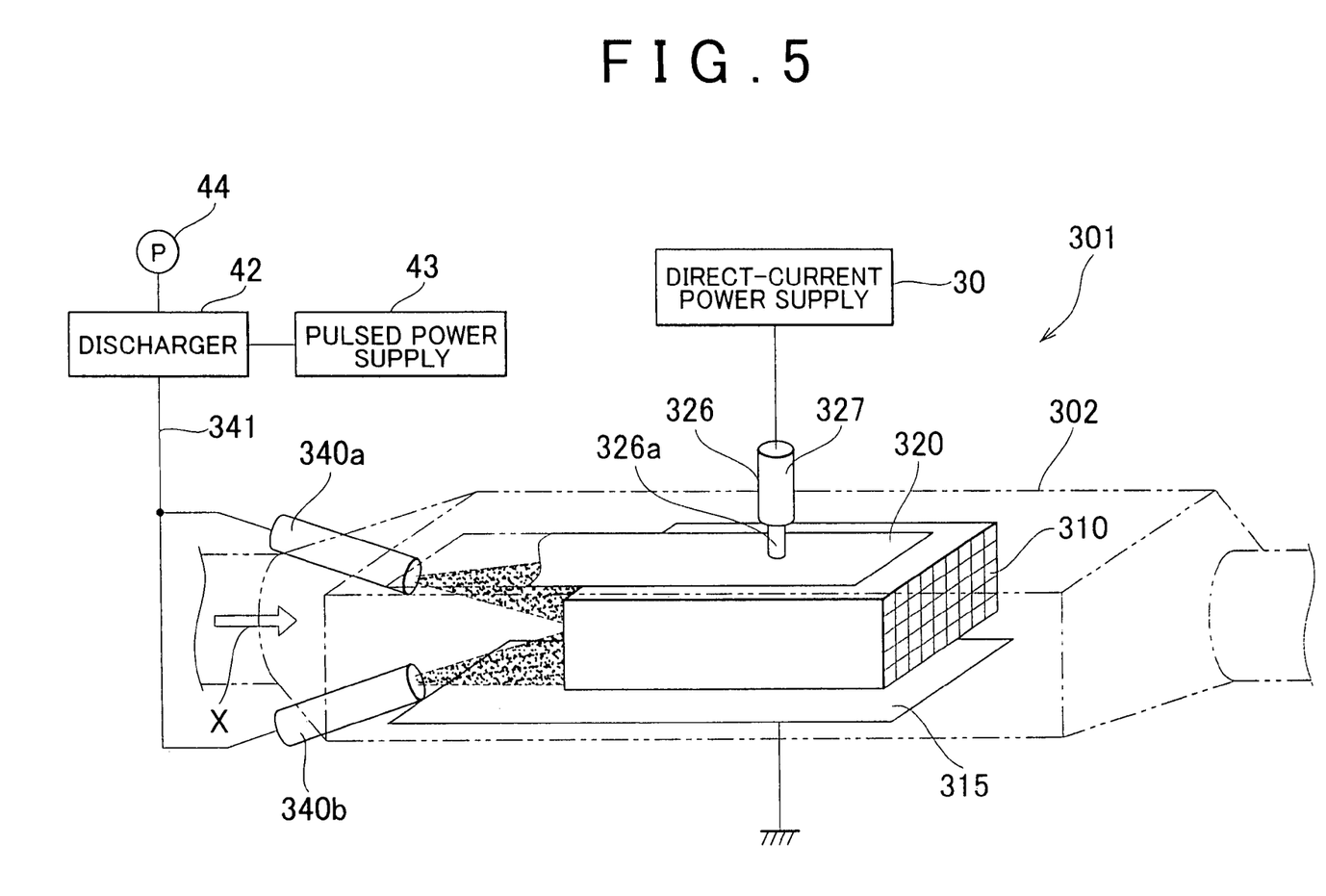
FIG. 5 is a schematic view of a gas purifying apparatus according to a fourth embodiment of the invention.

FIG. 5 is a schematic view of a gas purifying apparatus 301 according to the fourth embodiment. The gas purifying apparatus 301 includes a rectangular metal case 302 and a honeycomb structural body 310 that is supported inside the case 302.

The cross section of honeycomb structural body 310, which is orthogonal to the direction in which the exhaust gas flows, is substantially rectangular. The honeycomb structural body 310 has a plurality of cells, namely, a plurality of exhaust gas passages that are divided by the porous partition walls. Each exhaust passage is in parallel to the direction in which the exhaust gas flows through the gas purifying apparatus 301. A so-called straight flow type honeycomb structural body where the cells are open at both upstream ends and the downstream ends may be used as the honeycomb structural body 310. Alternatively a filter type or a so-called wall-flow type honeycomb structural body may be used as the honeycomb structural body 310. In the filter type or the wall flow type honeycomb structural body, the exhaust passages, which are closed at the upstream ends and which are open at the downstream ends, and the exhaust gas passages, which are closed at the downstream ends and which are open at the upstream ends, are alternately formed. The material of the honeycomb structural body 310, and the material of the NOx storage reduction catalyst applied onto the honeycomb structural body 310 are the same as those of the honeycomb structural body 10 in the first embodiment.

A discharge electrode plate 320 is provided on one of the surfaces (upper surface in FIG. 5) of the honeycomb structural body 310. Sealing is provided between the discharge electrode plate 320 and the case 302 by an alumina mat (not shown), or the like. A plug electrode 326a of a power supply plug 326 is connected to the discharge electrode plate 320. The plug electrode 326a is coated with an insulating layer 327. The plug electrode 326a and the case 302 are electrically insulated from each other by the insulating layer 327.

A receiving electrode plate 315 is provided on the side opposite to the discharge electrode plate 320, with the honeycomb structural body 310 interposed therebetween. The receiving electrode plate 315 is provided at a predetermined distance from the honeycomb structural body 310. The receiving electrode plate 315 is electrically grounded. The discharge electrode plate 320 and the receiving electrode plate 315 may be made of heat-resisting conductive material such as stainless steel.

At positions upstream of the honeycomb structural body 310 in the direction in which the exhaust gas flows, discharge ports 340a and 340b through which the pro-oxidant is supplied into the case 302 are fixed to the case 302. The discharge ports 340a and 340b are connected to the discharger 42 by the supply pipe 341 through which the pro-oxidant is supplied. The discharge ports 340a and 340b are provided such that the pro-oxidant discharged from the discharge ports 340a and 340b flows with the exhaust gas to the upstream end face of the honeycomb structural body 310, the discharge electrode plate 320 and the receiving electrode plate 315.

The direct-current power supply 30 is connected to the power supply plug 326. The configurations of the direct-current power supply 30 and the control system for controlling the direct-current power supply 30 are the same as in the first embodiment. Because the remaining configuration of the fourth embodiment is the same as the first embodiment, the same or corresponding portions are denoted by the same reference numerals, and detailed description thereof is not repeated here.

In the gas purifying apparatus 301 configured according to the fourth embodiment, exhaust gas containing the PM discharged from the engine is introduced to the case 302 through the exhaust pipe, flows into the honeycomb structural body 310 through the exhaust gas passages which are open at the upstream ends, and discharged downstream out of the honeycomb structural body 310 through the exhaust gas passages which are open at the downstream ends.

Meanwhile, corona discharge is generated between the electrodes (not shown) in the discharger 42, using the electric power supplied from the pulsed power supply 43, and acts on the air supplied due to the operation of the pump 44. Thus, the ozone serving as the activated species or the pro-oxidant is generated. The thus generated ozone is discharged from the discharge ports 340a and 340b, and supplied toward the upstream end face of the honeycomb structural body 310. The ozone promotes oxidization and/or burning of the PM contained in the exhaust gas and the PM (consisting mainly of carbon C) adhering to the honeycomb structural body 310.

As described so far in detail, according to the fourth embodiment, because the pro-oxidant supply source that supplies the ozone serving as the pro-oxidant is provided upstream of the honeycomb structural body 310 serving as the adsorption portion, removal of the PM adsorbed in the honeycomb structural body 310 by oxidizing and/or burning the PM is promoted. Accordingly, accumulation of the PM in the honeycomb structural body 310 is suppressed.

According to the fourth embodiment, because the honeycomb structural body is formed in a substantially rectangular column shape, the efficiency in arranging the entire device can be improved.

Figure 6:
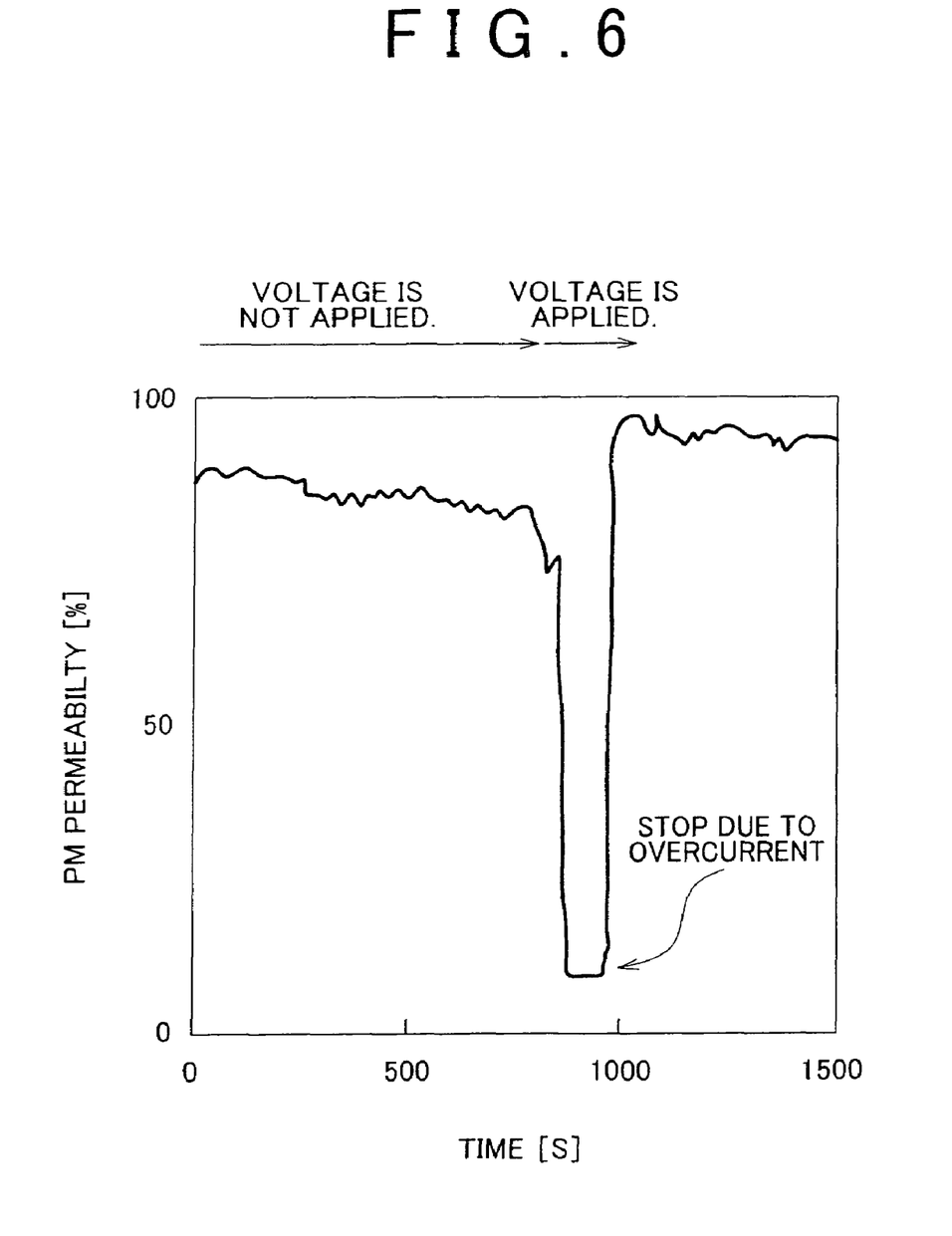
FIG. 6 is a graph showing the rate of purification of the exhaust gas when the gas purifying apparatus according to the first embodiment of the invention is used without supplying an pro-oxidant.
Figure 7:
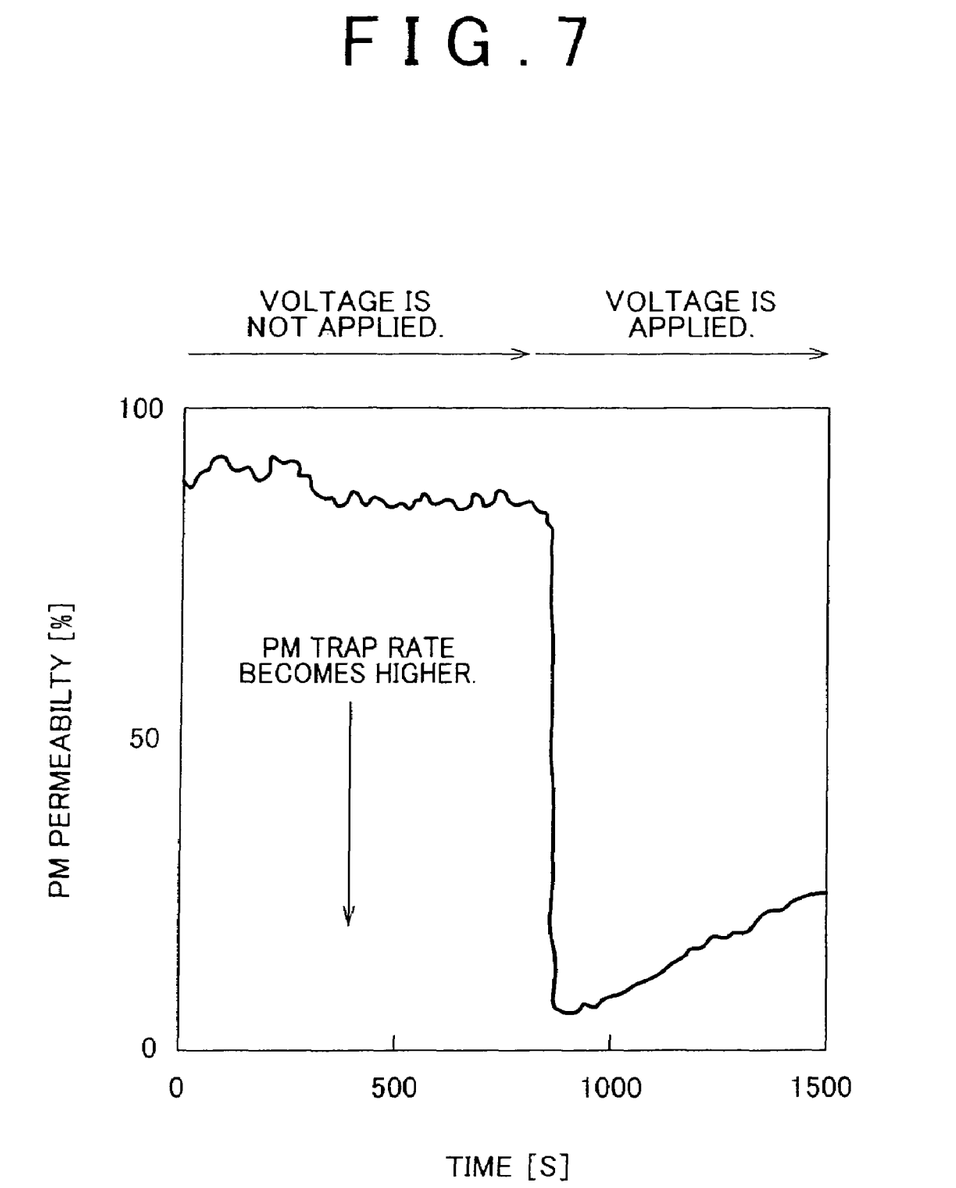
FIG. 7 is a graph showing the rate of purification of the exhaust gas when the gas purifying apparatus according to the first embodiment of the invention is used while the pro-oxidant is supplied.

The rate of purification of the PM when the pro-oxidant was not supplied and the rate of purification of the PM when the pro-oxidant was supplied were measured by using the gas purifying apparatus according to the first embodiment of the invention. The supply voltage of the direct-current power supply 30 was 30 kV. The amount of pro-oxidant supplied was 50 liters per minute (50 L/min), namely 50 liters of dry air containing 100 ppm of ozone was supplied per minute. An ELPI (Electrical Low Pressure Impactor) was used to measure the amount of PM. When the pro-oxidant was not supplied, as shown in FIG. 6, a short-circuit occurred between the electrodes in a short time after application of a voltage was started by the direct-current power supply 30, and the operation of the direct-current power supply 30 was stopped in response to generation of an overcurrent. On the other hand, when the pro-oxidant was supplied, as shown in FIG. 7, an overcurrent due to a short-circuit was not generated, and the gas was stably purified for a long time.

While the invention has been described with reference to exemplary embodiments thereof, is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

For example, in the embodiments described above, ozone is used as the pro-oxidant. However, an appropriate pro-oxidant that could be used in the invention would include at least one gas selected from the group consisting of ozone $O_3$, atomic oxygen O, superoxide anion radical $O_2^-$, hydroxyl radical $OH^-$, alkoxyl radical $R^-O_2$, nitrogen dioxide $NO_2$, and oxygen $O_2$. The pro-oxidant in the invention is not limited to those mentioned above, as long as the pro-oxidant enables the PM to be burned and/or oxidized at a lower temperature than when the pro-oxidant is not used (approximately 650° C. to 700° C.).

The pro-oxidant supply source in the invention may include the processing device such as the discharger 42 that produces the pro-oxidant by processing air. Alternatively, the pro-oxidant supply source may include a processing device that produces the pro-oxidant by processing a substance other than air. Also, the pro-oxidant supply source may include a tank that stores the pro-oxidant.

In the embodiments described above, the center electrode 20, 120, or 220, the case 2, the discharge electrode plate 320 and the receiving electrode plate 315 are used. However, the shapes and the configurations of the electrodes used in the invention are not particularly limited. For example, a mesh-type electrode may be used. The adsorption portion in the invention is not limited to the honeycomb structural body. The material and the configuration of the adsorption portion may be appropriately selected as long as the adsorption portion can adsorb the PM that passes through and is heat-resistant. For example, the electrode itself or a metal mesh may be used as the adsorption portion.

In the embodiments described above, the center electrodes 20, 120 or 220 is connected to the negative pole, and the case 2 or the receiving electrode plate 315 is grounded. However, the invention can be achieved as long as a predetermined high voltage is applied between the two electrodes. The center electrode may be connected to the positive pole. The electric current to be applied may be appropriately selected from a direct current, an alternating current, a pulse, and a combination of an alternating current or a direct current and a pulse. In addition, it is not necessary to apply the voltage at all times. Instead, the voltage may be applied when required, for example, when the PM needs to be trapped or the PM needs to be burned. In the embodiments described above, the invention is applied to purification of the exhaust gas emitted from an internal combustion engine of a vehicle. However, the invention can be applied to purification of the exhaust gas emitted from a vessel, an aircraft or the like. Also, the invention can be applied to purification of dust in a construction site, a plant and the like, and purification of floating particle in a tunnel. These and other similar cases are within the scope of the invention.

What is claimed is:

1. A gas purifying apparatus comprising:
   a first electrode and a second electrode that are opposite in polarity and that are used to produce an electric field;
   an adsorption member provided between the first electrode and the second electrode that adsorbs particulate matter contained in gas supplied to the gas purifying apparatus by an action of the electric field; and
   a supply device that supplies a pro-oxidant onto an upstream end face of the adsorption member.

2. The gas purifying apparatus according to claim 1, wherein the supply device includes a discharge port that faces a portion near at least one of the first electrode and the second electrode.

3. The gas purifying apparatus according to claim 1, wherein the supply device includes a discharge port that is provided near at least one of the first electrode and the second electrode.

4. The gas purifying apparatus according to claim 3, wherein:
   one of the first electrode and the second electrode passes through the adsorption member; and
   the one electrode that passes through the adsorption member includes a hollow portion into which the pro-oxidant flows, and communication holes formed near an upstream end of the one electrode that passes through the adsorption member such that the pro-oxidant is discharged from the hollow portion through the communication holes.

5. The gas purifying apparatus according to claim 3, wherein:
   one of the first electrode and second electrode passes through the adsorption member; and
   the supply device includes a discharge port through which the pro-oxidant is discharged and that is formed in a cylindrical shape and surrounds the one electrode that passes through the adsorption member.

6. The gas purifying apparatus according to claim 1, wherein the pro-oxidant includes at least one of ozone, atomic oxygen, superoxide anion radical, hydroxyl radical, alkoxyl radical, nitrogen dioxide, and oxygen.

7. The gas purifying apparatus according to claim 1, wherein the supply device comprises a processing device that produces the pro-oxidant by processing air.

8. The gas purifying apparatus according to claim 1, wherein the supply device further comprises a tank that stores the pro-oxidant.

9. The gas purifying apparatus according to claim 7, wherein the processing device comprises a discharger, a pulsed power supply that supplies electric power to the discharger, and a pump that supplies air to the discharger.

10. The gas purifying apparatus according to claim 1, wherein the gas purifying apparatus is connected to an exhaust port of an internal combustion engine.

11. The gas purifying apparatus according to claim 10, wherein the internal combustion engine is a diesel engine.

12. A gas purifying apparatus comprising:
    an adsorption member that adsorbs particulate matter contained in gas supplied to the gas purifying apparatus by an action of an electric field;
    a first electrode and a second electrode that are opposite in polarity and that are used to produce the electric field; and
    a supply device that includes a discharge port that supplies a pro-oxidant for oxidizing the adsorbed particulate matter to the adsorption member; wherein:
    the adsorption member is provided between the first electrode and the second electrode.

13. The gas purifying apparatus according to claim 12, wherein the discharge port supplies the pro-oxidant onto an upstream end face of the adsorption member.

14. The gas purifying apparatus according to claim 12, wherein:

one of the first electrode and the second electrode passes through the adsorption member; and the one electrode that passes through the adsorption member includes a hollow portion into which the pro-oxidant flows, and the discharge port comprises communication holes formed near an upstream end of the one electrode that passes through the adsorption member such that the pro-oxidant is discharged from the hollow portion through the communication holes.

15. The gas purifying apparatus according to claim 12, wherein:

one of the first electrode and second electrode passes through the adsorption member; and the discharge port is formed in a cylindrical shape and surrounds the one electrode that passes through the adsorption member.

16. The gas purifying apparatus according to claim 12, wherein the pro-oxidant includes at least one of ozone, atomic oxygen, superoxide anion radical, hydroxyl radical, alkoxyl radical, nitrogen dioxide, and oxygen.

17. The gas purifying apparatus according to claim 12, wherein the supply device comprises a processing device that produces the pro-oxidant by processing air.

18. The gas purifying apparatus according to claim 12, wherein the supply device further comprises a tank that stores the pro-oxidant.

19. The gas purifying apparatus according to claim 17, wherein the processing device comprises a discharger, a pulsed power supply that supplies electric power to the discharger, and a pump that supplies air to the discharger.

20. The gas purifying apparatus according to claim 12, wherein the gas purifying apparatus is connected to an exhaust port of an internal combustion engine.

21. The gas purifying apparatus according to claim 20, wherein the internal combustion engine is a diesel engine.

* * * * *